United States Patent
Kraus et al.

(10) Patent No.: US 9,366,352 B2
(45) Date of Patent: Jun. 14, 2016

(54) VALVE ASSEMBLY FOR SWITCHING AND/OR REGULATING A MEDIUM FLOW OF AN AEROSPACE ENGINE AND AEROSPACE ENGINE

(71) Applicant: Astrium GmbH, Taufkirchen (DE)

(72) Inventors: Stephan Kraus, Oedheim (DE); Thomas Maier, Lauffen (DE)

(73) Assignee: Astrium GmbH, Taufkirchen (DE)

( * ) Notice: Subject to any disclaimer, the term of this patent is extended or adjusted under 35 U.S.C. 154(b) by 18 days.

(21) Appl. No.: 14/444,327

(22) Filed: Jul. 28, 2014

(65) Prior Publication Data

US 2015/0028238 A1  Jan. 29, 2015

(30) Foreign Application Priority Data

Jul. 29, 2013  (DE) .......................... 10 2013 012 444

(51) Int. Cl.
*F16K 31/00* (2006.01)
*F02C 7/232* (2006.01)
*F16K 1/14* (2006.01)
*F16K 41/10* (2006.01)

(52) U.S. Cl.
CPC ................ *F16K 31/004* (2013.01); *F02C 7/232* (2013.01); *F16K 1/14* (2013.01); *F16K 31/007* (2013.01); *F16K 41/10* (2013.01)

(58) Field of Classification Search
CPC ....... F16K 31/004; F16K 31/007; F16K 1/14; F16K 41/10; F02C 7/232; F02M 51/0603
USPC ............................... 251/129.06, 335.1–335.3
See application file for complete search history.

(56) References Cited

U.S. PATENT DOCUMENTS

| | | | |
|---|---|---|---|
| 4,662,604 A * | 5/1987 | Cook ................. | F02M 25/0756 123/568.26 |
| 4,669,660 A | 6/1987 | Weber et al. | |
| 5,875,764 A * | 3/1999 | Kappel ................ | F02M 47/027 123/446 |
| 6,311,950 B1 * | 11/2001 | Kappel .............. | F02M 51/0603 251/129.06 |
| 6,371,085 B1 * | 4/2002 | Boecking ........... | F02M 51/0603 123/498 |
| 6,520,479 B1 * | 2/2003 | Sato ...................... | F16K 31/007 251/129.06 |
| 6,530,555 B1 | 3/2003 | Stoecklein et al. | |

(Continued)

FOREIGN PATENT DOCUMENTS

| | | |
|---|---|---|
| DE | 199 46 833 A1 | 5/2001 |
| DE | 199 58 705 A1 | 6/2001 |

(Continued)

OTHER PUBLICATIONS

German-language European Search Report dated Dec. 23, 2014 with partial English translation (nine (9) pages).

*Primary Examiner* — John Bastianelli
(74) *Attorney, Agent, or Firm* — Crowell & Moring LLP

(57) ABSTRACT

A valve assembly for switching and/or regulating a medium flow of an aerospace engine includes a drive, a valve and a flexible separator element. The drive includes one or more electrically actuatable actuators, which change their length in the direction of a longitudinal axis of the valve assembly when a control voltage is applied to the actuators. The valve includes a valve piston, which can be moved back and forth along the longitudinal axis by the drive and which has a valve member. The flexible separator element delimits a working space of the valve from the drive, as a result of which the medium, which flows through the valve or is present in the working space, is hermetically separated from the drive.

15 Claims, 1 Drawing Sheet

(56) References Cited

U.S. PATENT DOCUMENTS

| | | | | |
|---|---|---|---|---|
| 6,948,667 | B2 * | 9/2005 | Eichendorf | F02M 61/08 239/533.2 |
| 6,994,110 | B2 * | 2/2006 | Barillot | F16K 31/004 137/554 |
| 7,044,407 | B2 * | 5/2006 | Fischer | F02M 51/0603 239/453 |
| 7,055,765 | B2 * | 6/2006 | Liskow | F02M 51/0603 239/533.2 |
| 7,066,399 | B2 * | 6/2006 | Hohl | F02M 51/0603 239/102.2 |
| 7,267,111 | B2 * | 9/2007 | Liskow | F02M 51/005 123/498 |
| 7,309,032 | B2 | 12/2007 | Fischer et al. | |
| 2006/0278837 | A1 * | 12/2006 | Kienzler | F02M 51/0603 251/129.06 |

FOREIGN PATENT DOCUMENTS

| | | |
|---|---|---|
| DE | 102 60 349 A1 | 7/2004 |
| DE | 103 42 772 A1 | 4/2005 |
| DE | 10 2004 044 811 A1 | 3/2006 |
| DE | 10 2005 046 778 A1 | 4/2007 |
| DE | 10 2008 001 142 A1 | 10/2009 |
| DE | 10 2009 044 295 A1 | 9/2010 |
| DE | 10 2009 002 311 A1 | 10/2010 |
| DE | 10 2009 031 048 A1 | 1/2011 |
| DE | 10 2005 046 778 B4 | 7/2011 |
| EP | 1 167 748 A2 | 1/2002 |
| EP | 2 003 329 A1 | 12/2008 |

* cited by examiner

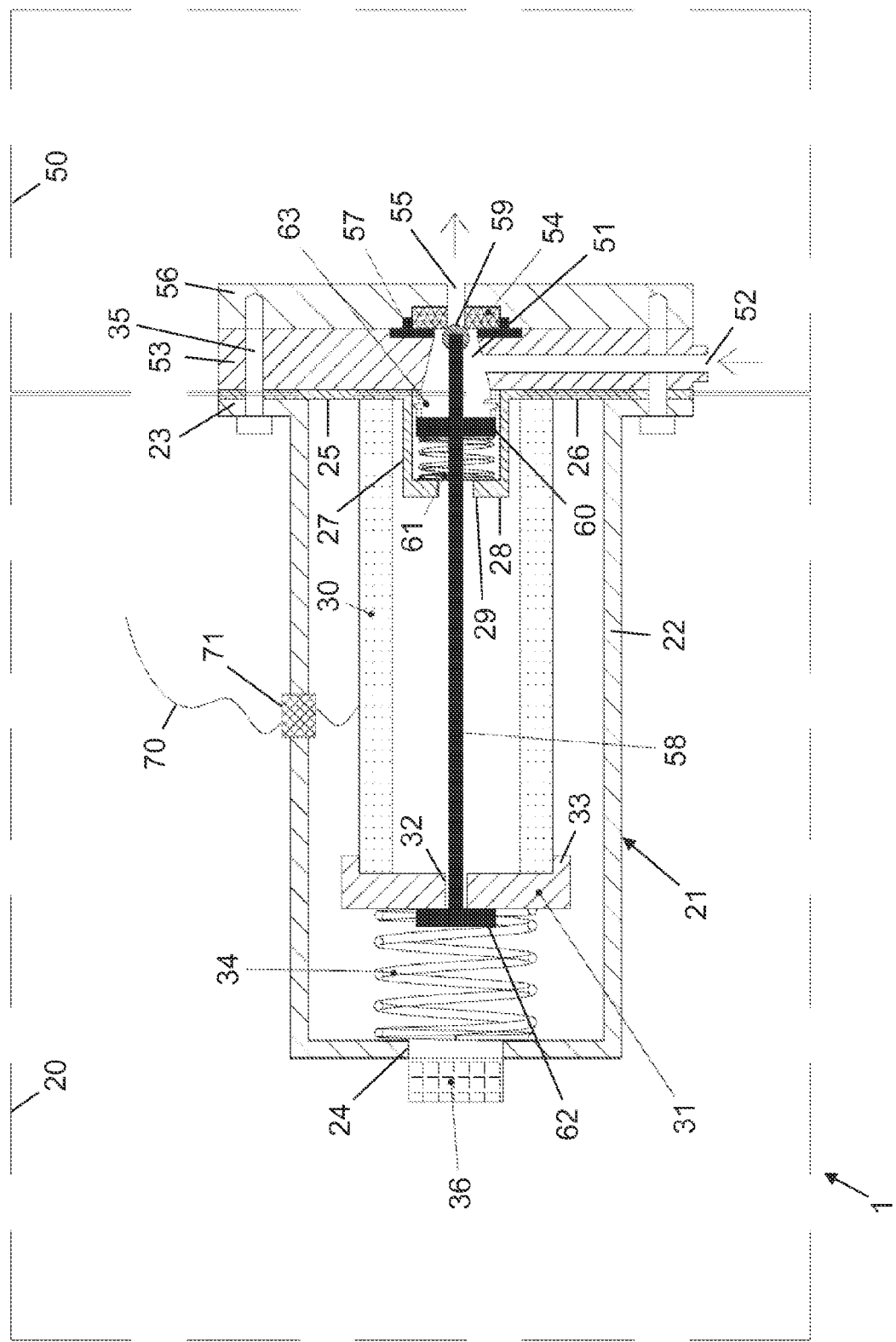

VALVE ASSEMBLY FOR SWITCHING AND/OR REGULATING A MEDIUM FLOW OF AN AEROSPACE ENGINE AND AEROSPACE ENGINE

CROSS-REFERENCE TO RELATED APPLICATIONS

This application claims priority under 35 U.S.C. §119 to German patent application number 10 2013 012 444.1, filed Jul. 29, 2013, the entire disclosure of which is wherein expressly incorporated by reference.

BACKGROUND AND SUMMARY OF THE INVENTION

Exemplary embodiments of the invention relate to a valve assembly for switching and/or regulating a medium flow of an aerospace engine, as well as to an aerospace engine.

Valves are generally used for switching or regulating the throughflow of a gaseous or liquid medium. Valve assemblies, which comprise solenoid valves, are usually used in aerospace engines. In these solenoid valves the medium that is to be regulated can be easily separated from a drive of the valve, a feature that is absolutely mandatory for use in aerospace engines due to the danger presented by the fuel. However, the medium flow can only be switched because solenoid valves have only the positions "open" or "closed." In order to regulate the medium, these solenoid valves have to be clocked-operated, a feature that can be achieved in the field only with difficulty.

Therefore, exemplary embodiments of the present invention are directed to a valve assembly that is structurally and/or operationally improved, on that it is possible to regulate the medium, even when the medium to be regulated is strictly separated from the drive of the valve assembly. Further, exemplary embodiments of the invention are also directed to an aerospace engine, with which the fuel feed can be better regulated.

In accordance with exemplary embodiments of the present invention a valve assembly designed for switching and/or regulating a medium flow of an aerospace engine comprises a drive, a valve and a flexible separator element. The drive has one or more electrically actuatable actuators, which change their length in the direction of a longitudinal axis of the valve assembly when a control voltage is applied to the actuators. Hence, the drive is an electric drive. The valve comprises a valve piston, which can be moved back and forth along the longitudinal axis by means of the drive and which has a valve member. The flexible separator element delimits a working space of the valve from the drive, as a result of which the medium, which flows through the valve or is present in the working space, is hermetically separated from the drive.

The combination of an electric drive one or more electrically actuatable actuators makes it possible to regulate the medium in conjunction with the separator element, even when the medium to be regulated is strictly separated from the drive. The valve can be operated by means of the electric drive not just in the two positions "open" and "closed" alone. Instead, the position of the valve member between these end positions can be variably changed, so that the medium flow can be adjusted in a desired manner. The net result is that it is possible to prevent the drive from being damaged by the medium and to prevent the medium from escaping in an uncontrolled manner from the working space. Therefore, the valve assembly is suitable for hazardous mediums, such as rocket fuels.

In one embodiment the flexible separator element surrounds the valve piston and is connected fluid-tight to the valve piston with a drive-sided end. The flexibility of the separator element allows the valve piston to move, so that the valve can be moved, as required, between its end positions "open" and "closed," by actuating the drive to match the requirements. At the same time the working space is separated from the drive.

The valve piston can have a piston plate, which extends perpendicular to the longitudinal axis of the valve assembly in a plane, so that the separator element is connected to the piston plate with the drive-sided end. This approach makes it easier to attach the separator element in such a way that it is fluid-tight.

In an additional embodiment the separator element is connected to a housing component of the drive or to a housing component of the valve with the valve-sided end. It is advisable that the diameter of the separator element at its drive-sided end correspond to the diameter at the valve-sided end. Thus, the separator element can have a somewhat cylindrical shape, a feature that greatly simplifies the geometric shape of the separator element.

The separator element can be a metal bellows. This arrangement ensures good stability in conjunction with the required flexibility. The separator element can also be a diaphragm.

The piston plate of the valve piston can be disposed in a housing shoulder, which extends in the direction of a drive housing and which is connected to the working space with its open end. The result is that when the valve is opened, the piston plate moves away from the working space in the direction of a shoulder plate of the housing shoulder, and that a first spring is disposed between the shoulder plate and the piston plate. This first spring presses the valve member against the valve seat, when a voltage is not applied to the actuator(s). The piston plate is used to offer the first spring an engagement face, which acts on the piston valve, in order to ensure that the valve member is pressed against the valve seat in, for example, a non-actuated state of the actuator(s).

In one embodiment the piston plate can be used not only for mounting the separator element, but also as an engagement face for the first spring. In another embodiment the piston plate can also be used only as an engagement face for the first spring. In this embodiment the separator element is mounted fluid-tight directly on the shank of the valve piston on the side that is located opposite the first spring.

The stroke of the valve piston between its end positions "closed" and "open" can be adjusted in a very simple way with high precision and with a minimum amount of energy, if the actuator(s) is or are a piezo actuator or piezo actuators, which changes or change its or their length when a voltage is applied to the actuator(s). If only one single piezo actuator is provided, then this actuator can be designed as a ring. If the drive comprises a plurality of piezo actuators, then they can be designed as a stack. The piezo actuators of the drive can be configured in a way, which is known to the person skilled in this art, in parallel or in series or in any combination thereof. The actuators are designed, in particular, in such a way that they expand, when a voltage is applied to them.

In an additional embodiment the actuator(s) is or are supported at its or their one end by a housing component, which is adjacent to the valve and is a part of the drive, or by a housing component of the valve. If the actuators expand when a voltage is applied to them, then the actuators expand in a direction facing away from the valve. The movement is transmitted to the valve piston, so that then the valve member moves away from the valve seat; and, as a result, the valve opens.

The actuator(s) is or are supported at its or their other end by a head plate, which is biased by a second spring. In this case the second spring applies a spring bias to the actuator(s). The head plate is pushed away from the valve, when the actuators expand as a voltage is applied to them. The force can be transmitted to the valve piston by way of the head plate.

For this purpose in one embodiment a valve piston head engages with the head plate. In this case the valve piston is guided through a bore in the head plate; and the valve piston head is connected to the valve piston on the side that is opposite the actuator(s). This arrangement ensures that the expansion of the actuators is transmitted, as described above, into the movement of the valve piston. The valve piston head can be disposed on the end of the valve piston that lies opposite the valve member. The valve piston head can be connected to the valve piston in a positive and/or non-positive manner.

The valve member can be, for example, a ball. The valve member can have a semi-spherical section, which faces the valve seat. The valve member can be a cone or a conical section, which faces the valve seat with its end that tapers to a point.

The valve assembly can comprise a device for determining an axial displacement of the valve piston. In this case a stroke, which can be determined by the device, can be made available for controlling the actuator(s). The result is that the stroke of the valve piston can be measured. The voltage source for actuating the actuator(s) can be controlled by feedback; and the length or more specifically the opening slit of the valve can be adjusted. This arrangement makes it possible to switch the valve not only between "open" (i.e., the maximum opening slit) and "closed," but also to adjust, as required, the opening slit between the end positions. This feature makes it possible to regulate the medium flow.

In one embodiment the actuator(s) is or are arranged in such a way that when a voltage is applied to the actuator(s), the actuator(s) causes or cause the valve to open due to an elongation; and, when no voltage is applied to the actuator(s), the actuator(s) closes or close the valve.

Furthermore, exemplary embodiments of the invention are directed to an aerospace engine, which comprises at least one valve assembly of the type described above. In the case of such an aerospace engine the fuel feed can be regulated reliably and precisely in a simple way. Moreover, the aerospace engine has the above described advantages. An additional advantage of an engine system that is driven in this way is the ability to freely adjust the mixing ratio and the thrust, so that there is no need, among other things, for trimming diaphragms.

BRIEF DESCRIPTION OF THE DRAWING FIGURE

The invention is explained in detail below with reference to one exemplary embodiment.

FIG. 1 is a schematic drawing of an inventive valve assembly, which can be used in an aerospace engine.

DETAILED DESCRIPTION

Referring to FIG. 1, the valve assembly 1 comprises a drive 20 and a valve 50 as the main components.

The drive 20 comprises one or more electrically actuatable actuators 30 in the form of piezo actuators. When a voltage is applied to the actuator(s), the actuator(s) expands or expand in the direction of a longitudinal axis of the valve assembly 1. In FIG. 1 the longitudinal axis extends from the left to the right in the plane of the drawing. If the drive 20 comprises only a single piezo actuator 30, then this piezo actuator is designed, for example, as a ring, which extends in a concentric manner about the longitudinal axis of the valve assembly 1. If the drive 20 comprises a plurality of piezo actuators 30, then these piezo actuators can be designed as individual stacks, which are arranged in the form of a circle around the longitudinal axis. The individual elements of the piezo actuator(s) 30 of the drive 20 can be arranged in parallel or in series or in any combination thereof. For the sake of simplicity of the description, it is assumed in the following that the drive 20 of the exemplary embodiment shown in FIG. 1 comprises a plurality of piezo actuators 30.

The valve 50 comprises a valve piston 58, which can be moved back and forth along the longitudinal axis by means of the drive 20. The valve piston has a spherical valve member 59 on an end facing the valve 50. The other end of the valve piston 58 ends in a housing of the drive 20 (referred to hereinafter as the drive housing 21). The valve 50 comprises a working space 51, into which a gaseous or liquid medium, for example, fuel, can flow by of an inlet port 52. The medium can escape from the valve 50 through an outlet port 55, which can be closed by the valve member 59. When the valve 50 is open, the direction of flow is indicated by the arrows at the inlet port 52 and the outlet port 55. The inlet port 52 is formed by a channel, which runs transversely to the longitudinal direction, in an inlet plate 53. The outlet port 55 is formed by a channel, which runs in the longitudinal direction, in an outlet plate 56. In the outlet plate 56 there is a valve seat 54 with a central bore. In the region of the valve seat 54 the inlet plate 53 and the outlet plate 56 are connected to each other by means of a sealing body 57. The sealing body 57 extends around the central bore of the valve seat 54.

The working space 51 empties into a housing shoulder 27 of the drive housing 21. The piezo actuators 30 are disposed in the drive housing 21. The drive housing 21 comprises a first housing section 22 and a second housing section 25. The first housing section 22 comprises a flange 23, which is connected to the bottom 26 of the second housing section 25, for example, by means of a screw connection. The second housing section 25 comprises the housing shoulder 27. The housing shoulder 27 extends in the direction of the interior of the driving housing 21, so that the housing shoulder comes to rest between the piezo actuators 30.

The housing shoulder 27 has a shoulder plate 28 extending radially in relation to the longitudinal axis. The shoulder plate has a centrally arranged recess 29, through which the valve piston 58 passes. The valve piston 58 has a piston plate 60, which extends perpendicularly to the longitudinal axis of the valve assembly 1 in a plane. The piston plate 60 is rigidly connected to the valve piston 58 and moves together with this valve piston in a volume that is defined by the housing shoulder 27. Between the shoulder plate 28 and the piston plate 60 there is a first spring 61, which applies a bias to the valve piston 58. If the piezo actuators 30 are not actuated, then the valve member 59 is pressed against the valve seat 54 by means of the spring force of the first spring 61. As a result, the valve 50 is closed in the non-energized state. Then the piston plate 60 is located at the end of the volume defined by the housing shoulder 27, wherein this end of the housing shoulder faces the working space 51.

Actuating the piezo actuators 30 has the effect of moving the valve piston 58 to the left in the drawing, as soon as the spring force of the first spring 61 is overcome. As a result, the valve member 59 is moved away from the valve seat 54. This means that the valve 50 is open. The resulting opening slit depends on the voltage applied to the piezo actuators 30.

The force is transmitted from the piezo actuators 30, which expand upon actuation, by way of a valve piston head 62 of the valve piston 58, which is designed in this case as a plate. The piezo actuators are supported by the bottom 26 of the second housing section 25. With their other end the piezo actuators 30 are in contact with a head plate 31. The valve piston head 62, which can be moved in the longitudinal direction in the drive housing 21, is biased by a second spring 34. The second spring 34 generates a force, which is directed opposite the direction of expansion of the piezo actuators 30. In order for the piezo actuators 30 to rest against the head plate 31 in a defined way, this head plate includes an edge 33, which encircles the piezo actuators 30. The head plate 31 includes a central recess (bore) 32, through which the valve piston 58 passes. The valve piston head 62 of the valve piston 58 is in contact with the side of the head plate 31 that faces away from the piezo actuators 30.

When the piezo actuators 30 are actuated, the valve piston 58 is moved, subject to overcoming the spring force of the first spring 61, to the left in the drawing due to the elongation (expansion) of the piezo actuators 30. As a result, the head plate 31 is also moved to the left against the spring force of the second spring 34. Coupling the head plate 31 with the valve piston head 62 has the effect of moving the valve piston 58 to the left, as a result of which the valve member 59 is then moved away from the valve seat 54.

An optional device 36 for determining an axial displacement of the valve piston 58 is mounted on the side of the housing that faces away from the valve 50. With this device 36 it is possible to determine the stroke travelled by the valve piston 58. This stroke can be used to control the piezo actuators 30. The device 36 can be based, for example, on a principle of optical measurements. Other measurement principles can also be used. The detection can be carried out by means of a recess 24 of the first housing section 22.

In order to actuate the piezo actuators 30, a line 70 is run into the interior of the drive housing 21. The line 70 is run through a passage 71 into the interior of the drive housing 21, which is otherwise hermetically sealed.

The working space 51 of the valve 50 is delimited from the drive 20 by means of a separator element 63. The separator element 63 surrounds the valve piston 58 and is connected fluid-tight to the piston plate 60 on the drive side. The term "fluid-tight" means that the connecting point does not allow the medium, which is switched or regulated by the valve, to pass. Furthermore, the separator element 63 is connected to the inlet plate 52 on the valve side. The separator element 63 is generally configured in such a way that the medium, which flows through the valve 50 or which is present in the working space 51, is hermetically separated from the drive 20. The separator element 63 is, for example, a cylindrical metal bellows or a diaphragm.

The first housing section 22, the second housing section 25, the inlet plate 53 and the outlet plate 56 are connected to each other by means of a screw connection in the illustrated example. The screws are marked with the reference numeral 35. The components can also be welded to each other.

The valve 50 can be designed in such a way that no additional elements are arranged downstream of the valve seat 54. This arrangement makes it possible for the volume downstream to be kept very small. This feature is advantageous in the event that the valve is used in an aerospace engine for regulating and for switching the propellant feed.

In general the valve assembly can be used in all such environments, in which throughflow of mediums are to be switched or regulated.

In summary the valve assembly has the following advantages:

The combination of an electric drive with one or more electrically actuatable actuators makes it possible in conjunction with the separator element to regulate a medium, even if the medium to be regulated is strictly separated from the drive of the valve assembly.

The valve can be operated by means of the electric drive not just in two positions "open" and "closed" alone. Instead, the position of the valve member can be changed variably between these end positions, so that the medium flow can be adjusted in a desired way.

The net result is that it is possible to prevent the drive from being damaged by medium and to prevent the medium from escaping in an uncontrolled manner from the working space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 1 valve assembly
20 drive
21 drive housing
22 first housing section
23 flange
24 recess for the stroke measuring device 36
25 second housing section
26 bottom
27 housing shoulder
28 shoulder plate
29 recess (bore) for the valve piston 58
30 actuator
31 head plate
32 recess (bore) for the valve piston 58
33 edge of the head plate
34 second spring
35 screw
36 stroke measuring device
50 valve
51 working space
52 inlet port
53 inlet plate
54 valve seat
55 outlet port
56 outlet plate
57 sealing body
58 valve piston
59 valve member
60 piston plate
61 first spring
62 valve piston head
63 separator element
70 line
71 passage

What is claimed is:
1. A valve assembly configured to switch or regulate a medium flow of an aerospace engine, the valve assembly comprising:

a drive, which has one or more electrically actuatable actuators, which are configured to change their length in a direction of a longitudinal axis of the valve assembly when a control voltage is applied to the one or more electrically actuatable actuators;

a valve, which comprises a valve member and a valve piston configured to move back and forth along the longitudinal axis by the drive; and a flexible separator element, which delimits a working space of the valve from the drive and hermetically separates the drive from the medium flowing through the valve or present in the working space, wherein the piston plate of the valve piston is disposed in a housing shoulder extending in a direction of a drive housing and which is connected to the working space with its open end, when the valve is opened the piston plate moves away from the working space in a direction of a shoulder plate, a first spring is disposed between the shoulder plate and the piston plate, and the first spring presses the valve member against a valve seat when a voltage is not applied to the one or more electrically actuatable actuators.

2. The valve assembly of claim 1, wherein the flexible separator element surrounds the valve piston and is connected fluid-tight to the valve piston with a drive-sided end.

3. The valve assembly of claim 1, wherein the valve piston has a piston plate, extending perpendicular to the longitudinal axis of the valve assembly in a plane, with the flexible separator element being connected to the piston plate with the drive-sided end.

4. The valve assembly of claim 1, wherein the flexible separator element is connected to a housing component of the drive or to a housing component of the valve with a valve-sided end.

5. The valve assembly of claim 1, wherein the flexible separator element is a metal bellows or a diaphragm.

6. The valve assembly of claim 1, wherein the one or more electrically actuatable actuators is a piezo actuator configured to change its length when a voltage is applied to the one or more electrically actuatable actuators.

7. The valve assembly of claim 1, wherein the one or more electrically actuatable actuators is supported at one end by a housing component, which is adjacent to the valve and is a part of the drive, or by a housing component of the valve.

8. A valve assembly configured to switch or regulate a medium flow of an aerospace engine, the valve assembly comprising:

a drive, which has one or more electrically actuatable actuators, which are configured to change their length in a direction of a longitudinal axis of the valve assembly when a control voltage is applied to the one or more electrically actuatable actuators;

a valve, which comprises a valve member and a valve piston configured to move back and forth along the longitudinal axis by the drive; and a flexible separator element, which delimits a working space of the valve from the drive and hermetically separates the drive from the medium flowing through the valve or present in the working space, wherein the one or more electrically actuatable actuators is supported at a second end by a head plate, which is biased by a second spring, wherein the second spring applies a spring bias to the one or more electrically actuatable actuators.

9. The valve assembly of claim 8, wherein a valve piston head engages with the head plate, the valve piston is guided through a bore of the head plate, and the valve piston head is connected to the valve piston on a side that is opposite the one or more electrically actuatable actuators.

10. The valve assembly of claim 1, wherein the valve member is a ball.

11. The valve assembly of claim 1, further comprising:

a device configured to determine an axial displacement of the valve piston, wherein the device outputs a determined stroke to control the one or more electrically actuatable actuators.

12. The valve assembly of claim 1, wherein the one or more electrically actuatable actuators is arranged in such a way that when a voltage is applied to the one or more electrically actuatable actuators, the one or more electrically actuatable actuators causes the valve to open due to an elongation; and, when no voltage is applied to the one or more electrically actuatable actuators, the one or more electrically actuatable actuators closes the valve.

13. An aerospace engine, comprising:

at least one valve assembly configured to switch or regulate a medium flow of the aerospace engine, wherein the valve assembly comprises a drive, which has one or more electrically actuatable actuators, which are configured to change their length in a direction of a longitudinal axis of the valve assembly when a control voltage is applied to the one or more electrically actuatable actuators;

a valve, which comprises a valve member and a valve piston configured to move back and forth along the longitudinal axis by the drive; and a flexible separator element, which delimits a working space of the valve from the drive and hermetically separates the drive from the medium flowing through the valve or present in the working space, wherein the one or more electrically actuatable actuators is supported at a second end by a head plate, which is biased by a second spring, wherein the second spring applies a spring bias to the one or more electrically actuatable actuators.

14. The aerospace engine of claim 13, the valve assembly further comprising:

a valve piston head engages with the head plate, the valve piston is guided through a bore of the head plate, and the valve piston head is connected to the valve piston on a side that is opposite the one or more electrically actuatable actuators.

15. An aerospace engine, comprising:

at least one valve assembly configured to switch or regulate a medium flow of the aerospace engine, wherein the valve assembly comprises a drive, which has one or more electrically actuatable actuators, which are configured to change their length in a direction of a longitudinal axis of the valve assembly when a control voltage is applied to the one or more electrically actuatable actuators;

a valve, which comprises a valve member and a valve piston configured to move back and forth along the longitudinal axis by the drive; and a flexible separator element, which delimits a working space of the valve from the drive and hermetically separates the drive from the medium flowing through the valve or present in the working space, wherein the piston plate of the valve piston is disposed in a housing shoulder extending in a direction of a drive housing and which is connected to the working space with its open end, when the valve is opened the piston plate moves away from the working space in a direction of a shoulder plate, a first spring is disposed between the shoulder plate and the piston plate, and the first spring presses the valve member against a valve seat when a voltage is not applied to the one or more electrically actuatable actuators.

* * * * *